Oct. 16, 1934.   M. B. SAWYER   1,977,490
HYDRAULIC FEED ELECTRIC DRILL
Filed Dec. 30, 1930   3 Sheets-Sheet 2

INVENTOR
Marion B. Sawyer
BY Fred C. Matheny
ATTORNEY

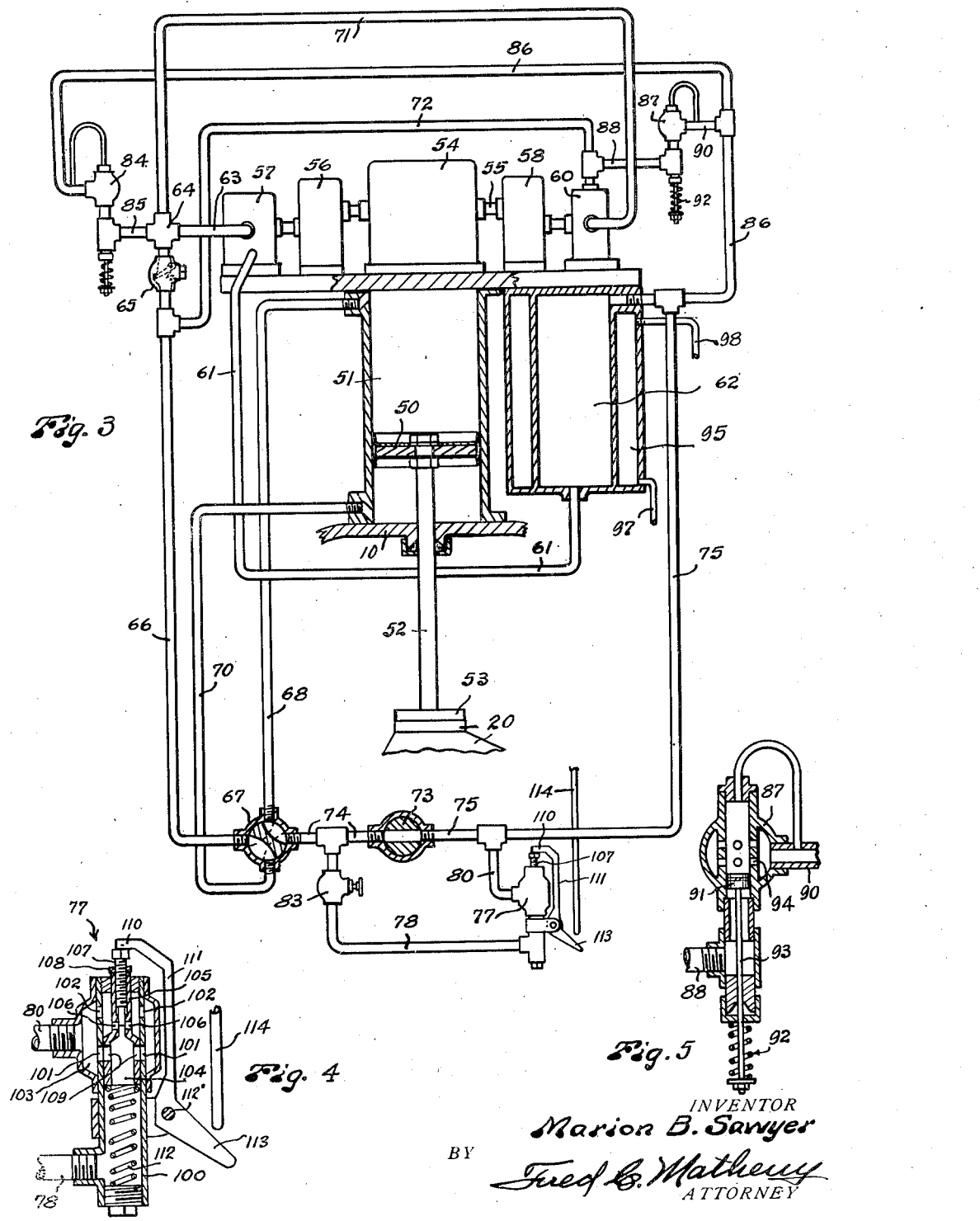

Patented Oct. 16, 1934

1,977,490

UNITED STATES PATENT OFFICE 1,977,490

HYDRAULIC FEED ELECTRIC DRILL

Marion B. Sawyer, Seattle, Wash.

Application December 30, 1930, Serial No. 505,514

5 Claims. (Cl. 77—32)

My invention relates to power operated drills and the general object of my invention is to provide an electrically driven, hydraulically fed multiple speed drill which is very efficient in operation and capable of high speed work.

Another object is to provide a power operated drill in which the feed of the drill is automatically retarded or slowed up just before said drill breaks through the work which is being drilled, thereby preventing damage to the drill.

Another object is to provide an electric drill of simple and compact construction in which the motor shaft is tubular and the main drill shaft extends downwardly through the tubular motor shaft, said tubular motor shaft serving to drive said drill shaft through a transmission located at the upper end of the motor. This telescopic driving shaft arrangement forms a very compact driving unit in which the torque and thrust are centralized, the driving strains are evenly distributed and vibration is reduced to a minimum.

A further object of my invention is to provide an electric drill in which the vertical feed movements of said drill are under hydraulic control which makes possible relatively fast lowering and raising speeds of the drill toward and away from the work and a slower feed while the drill is in the work and which makes it possible to maintain any desired feed pressure within predetermined limits on the drill regardless of the nature or hardness of the material which is being drilled.

In the construction of large heavy drills for drilling large holes in iron, steel and like hard metals it is very desirable and is conducive to speed and efficiency in the work to be able, accurately and instantly to control the feed and pressure of the drill. It is also desirable to have automatic means, independent of the operator, for retarding or slowing up the feed of the drill just before it breaks through the work to thereby lessen the danger of breaking the drill. In accordance with this invention I provide means for controlling the drill feed by controlling the exhaust or outlet of liquid from the hydraulic cylinder through which the pressure for feeding the drill is obtained.

I further provide adjustable means, operated by the downward movement of the drill unit, for automatically reducing the area of the opening in a valve in the exhaust passageway just before the drill breaks through the work which is being drilled thereby avoiding breakage of the point of the drill.

Other and more specific objects of the invention will be apparent from the following description taken in connection with the accompanying drawings.

In the drawings Figure 1 is a side elevation of a power operated drill constructed in accordance with my invention.

Fig. 3 is a somewhat diagrammatic view partly in elevation and partly in section of the hydraulic circulation and control means for the drill.

Fig. 4 is a detached sectional view on a larger scale of an automatic slow speed feed control valve.

Fig. 5 is a detached sectional view on a larger scale of a pressure controlled bypass valve.

Figure 1:
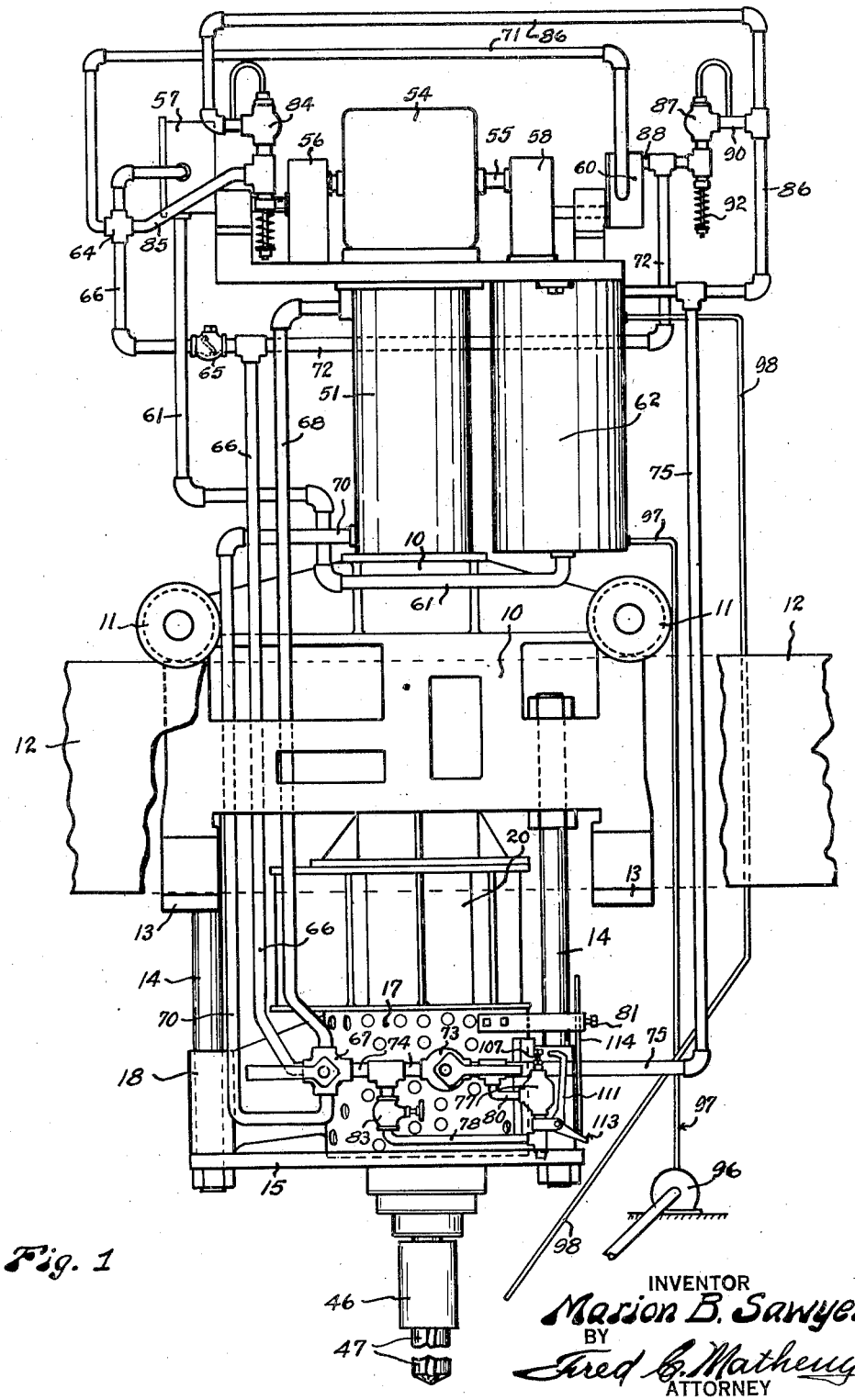

Referring to the drawings, throughout which like reference numerals designate like parts, 10 designates a drill carriage which is provided with wheels 11 supported on the top edges of track members 12 and which further has hold back flanges 13 arranged to engage with the bottom edges of the track members 12, or with similar supports, to resist the thrust when the drill is being pressed against the work.

The drill carriage 10 is provided with a plurality of downwardly extending guide rods 14 which are secured at their bottom ends to a circular or oval shaped ring or frame 15. The frame 15 is open in the center to afford clearance for a drill unit and motor of a form hereinafter described. In the accompanying disclosure I have shown three of the guide rods 14 but a greater or less number of said guide rods may be used. The open center frame member 15 rigidly connects the bottom ends of all of the rods 14 and cooperates in holding these rods in accurately positioned relation whereby rigid and accurate guide means for the drilling unit is formed.

The drill unit embodies a motor housing 17 externally provided with relatively fixed guide means 18 which is slidable on the guide rods 14, said motor housing having a gear case 20 fixedly secured to the top end thereof. An electric motor is disposed within the motor housing, said motor embodying a stator member 21 which is secured to the housing and a rotor member 22 which is fixedly connected with a tubular motor shaft 23. The tubular motor shaft 23 is journaled in suitable antifriction bearings 24, provided respectively, in the bottom end wall 25 and the top end wall 26 of the housing. Suitable packing rings 27 are provided to prevent the passage of lubricant from the bearings 24 into the motor and another packing ring 28 is provided above the upper bearing 24 to prevent lubricant from the gear case 20 from passing down through the bearing 24 and into the motor.

The upper end of the tubular motor shaft 23 has a pinion 30 fixedly secured thereon. The pinion 30 meshes with a gearwheel 31 which is rigidly secured to a countershaft 32.

Three gearwheels 33, 34 and 35, which are preferably formed as one piece or are rigidly connected with each other whereby they may be moved as a unit, are splined on the shaft 32 as by means of a key 36 and are arranged to be moved lengthwise on said shaft 32 by a shifter 37. The gearwheels 33, 34 and 35 are of different size and are arranged to mesh, respectively, with gearwheels 39, 40 and 41 respectively also of different size, which are secured to the upper end of a main drill shaft 42. A thrust bearing 43 and a radial bearing 44 are provided for the shaft 42 above the gear wheels 39, 40 and 41. The main drill shaft 42 extends downwardly through the tubular motor shaft 23 and is provided below the end of motor shaft 23 with a combined radial and thrust bearing 45. The lower end of said main drill shaft 42 is connected with a chuck 46 for the reception of a drill 47. Suitable housing means 48 is provided at the lower end of the shaft 42 for enclosing the bearing 45 and associated parts.

Figure 2:
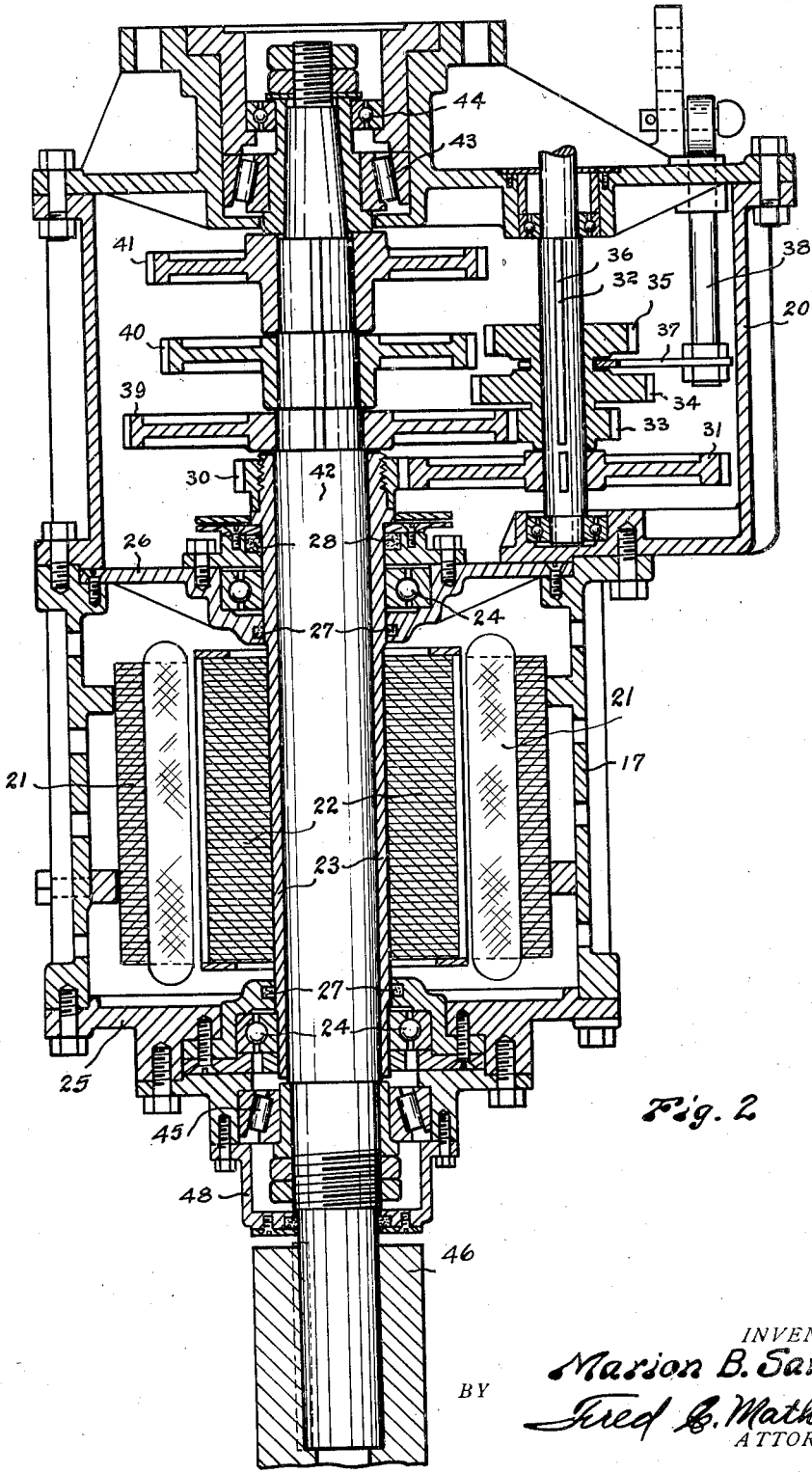
Fig. 2 is a sectional view on a larger scale through the drilling unit of the same.

In the position shown in Fig. 2, the smaller gearwheel 33 on the countershaft 32 is in mesh with the larger gearwheel 39 on the main drill shaft 42 thus establishing a slow speed driving ratio from the motor shaft 23 through pinion 30, gearwheel 31, countershaft 32 and gearwheels 33 and 39 to the main drill shaft 42. If the shifter member 37 is moved upwardly far enough to unmesh gearwheels 33 and 39 and mesh gearwheels 34 and 40 the low driving relation will be broken and a high speed driving relation will be established. If the shifter is moved still farther upward the gearwheels 34 and 40 will be unmeshed and the gearwheels 35 and 41 will be meshed thus establishing an intermediate speed driving relation. This provides for three different drilling speeds from a constant speed motor. The gears are not designed to be shifted while in motion. The shifter 37 is connected with an operating rod 38 which extends upwardly through the top of the gear case and is arranged to be permanently held in any desired position.

The drill unit is moved vertically toward and away from the work by hydraulic means including a piston 50 operable in a cylinder 51 which is mounted on the carriage frame 10. The piston 50 is connected by a piston rod 52 and flange means 53 with the top end of the gear case 20.

The means for controlling the flow of liquid to and away from the hydraulic cylinder 51 constitutes an important part of this invention. This means includes an electric motor 54 having a main driven shaft 55, one end of which is connected by a speed reduction gear 56 with a low pressure hydraulic pump 57 and the other end of which is connected by another speed reduction gear 58 with a high pressure hydraulic pump 60. Both of these pumps 57 and 60 run continuously when the motor 54 is in operation. The intake of the low pressure pump 57 is connected by a pipe 61 with the bottom end of a storage tank 62 wherein oil or other liquid may be stored. The discharge of the low pressure pump is through a pipe 63; four way fitting 64, check valve 65 and pipe 66 to a four way direction control valve 67. From the direction control valve 67 one pipe 68 leads to the upper end of the hydraulic cylinder 51 and another pipe 70 leads to the lower end of said hydraulic cylinder 51. From the fitting 64 a pipe 71 leads to the intake of the high pressure pump 60 and from the discharge of said high pressure pump 60 a pipe 72 leads to, and is connected with, the pipe 66 between the check valve 65 and the direction control valve 67. When connected in this manner the high pressure pump will always draw its supply of liquid from the pressure line of the low pressure pump and will deliver to the direction control valve 67 through the same pipe as the low pressure pump.

The speed of movement of the drill unit in both directions is governed by controlling the exhaust or escape of liquid from the end of the hydraulic cylinder 51 toward which the piston 50 is moving. I accomplish this by providing a speed regulating valve 73 which is connected by a pipe 74 with the direction control valve 67 and by another pipe 75 with the upper end of the oil reservoir 62. All liquid which is exhausting from the cylinder 51 must flow through either the pipe 68 or the pipe 70 to the direction control valve 67, thence through the pipe 74 and speed control valve 73 to the pipe 75 through which it returns to the oil reservoir 62. Obviously the rate of flow of the exhaust liquid may be governed by regulating the amount of opening of the valve 73.

An automatic slow feed valve 77 is connected by a pipe 78 with the pipe 74 and by another pipe 80 with the pipe 75 in such a manner that the conduit including the valve 77 forms a by pass around the valve 73.

The valve 77, see Fig. 4, may consist of a tubular housing 100 having two sets of ports 101 and 102 respectively spaced one set above the other. These ports open into a common receptacle 103 within the valve body. A tubular piston 104 is slidable within the tubular housing 100 and is provided with a tubular stem 105, of smaller diameter, which extends upwardly through the top of the housing 100. Ports 106 are provided within the tubular stem 105 and an adjustable screw 107 is threaded into said stem and locked in any adjusted position by a lock nut 108. Vertical adjustment of the screw 107 varies the area of the ports 106 by reason of the end of said screw overlapping said ports. Ports 109 are provided in the larger tubular piston 104 for registration with the ports 101 when said piston is held down, in the position shown in Fig. 4, by engagement of a hook 110 on the upper end of a lever 111 with the lock nut 108. A spring 112 urges the piston 104 upwardly. The lever 111 is fulcrumed on the valve body 77 by a pivot 112' and said lever has an outwardly extending lower end 113 positioned in the path of a trip member 114 which is adjustably secured as by a screw 81 to the motor housing. As the drill unit moves downwardly and just before the drill breaks through the work the trip member 114 engages the end 113 of the trip lever 111 and releases the piston 104—105 thus permitting the spring 112 to move the tubular piston assembly 104—105 upwardly and close the ports 109—101. This greatly restricts the passageway through the valve by compelling all of the liquid to flow through ports 106 thereby greatly slowing up the feed of the drill just before the drill point breaks through the work. This is an important feature of the invention as it prevents breaking of the drill point, a thing which is liable to occur if the downward movement of the drill is not checked before it breaks through the work. A manually controlled valve 83 is provided in the pipe 78 for manually controlling the flow of liquid through the by-pass formed by pipe 78, valve 77, and pipe 80. By closing the valve 73 and adjusting the valve 83 it is possible to control the flow of exhaust liquid from the cylinder 51 in such a manner as to secure any desired rate of downward movement of the drill into the work and then to have this rate movement decreased or slowed up to any desired extent by automatic closing of the valve 77 just before the drill breaks through the work thus preventing breakage of the drill point and finishing a cleaner hole through the work.

Control of the longitudinal movement of the drill by controlling the exhaust of liquid from pressure cylinder 51 is made possible by a system of by-passing liquid from the pumps 57 and 60 back to the liquid reservoir 62 when the pressure in the discharge lines from said pump exceeds a predetermined amount. To this end I provide a low pressure relief valve 84 which is connected by a pipe 85 and by the fitting 64 and pipe 63 with the low pressure pump 57 and by another pipe 86 with the oil reservoir 62 in such a manner that when the oil discharging from the low pressure pump 57 exceeds a predetermined pressure it will by-pass through the valve 84 and return to the reservoir 62. In a similar manner a high pressure relief valve 87 has one side connected by a pipe 88 with the discharge conduit 72 from the high pressure pump and the other side connected by a pipe 90 with the relief pipe 86 which leads back to the reservoir 62.

The valves 84 and 87 may be of similar construction each with a piston 91 retained by a spring 92 on a stem 93. When the piston is moved upwardly far enough ports 94 are uncovered and liquid is allowed to by-pass to the pipe 86. The spring on the valve 84 which is connected with the low pressure pump will necessarily be adjusted to allow this valve to by-pass liquid at a lower pressure than the spring on the by-pass valve 87 which is connected with the high pressure pump 60. The valve member in the high pressure valve may also be smaller, if desired. The check valve 65 prevents liquid under high pressure from the pump 87 from by-passing to the reservoir 62 through the low pressure by-pass valve 84.

The reservoir 62 is preferably surrounded by a water jacket space 95. Water which may be picked up preferably from a sump, not shown, is pumped as by a pump 96 through conduit means 97 into water jacket space 95 and flows from said space 95 through a conduit 98 by which it is delivered to a location near the drill point to cool the drill when the same is in operation.

In the operation of this hydraulically controlled electric drill the drill is rotated at a desired speed by the motor 21—22 which drives through the variable speed gears in the gear case 20. To raise the drill unit the valve 67 is turned into the position shown in Fig. 3, thereby connecting the pipe 70 which communicates with the lower end of the cylinder 51 with the pressure pipe 66 leading from the pumps and at the same time connecting the pipe 68 which leads to the upper end of the cylinder 51 with the pipe 74 which leads through the valve 73 which will preferably be open, and pipe 75 to the reservoir 62. This allows liquid to be freely pumped by both of the pumps 57 and 60 into the cylinder 51 below the piston 50 for raising such piston. During the retraction or upward movement of the drilling unit the valve 73 will preferably be wide open, thus allowing a free exhaust of the liquid from above the piston 50 through pipe 68, valve 67, pipe 74 valve 73 and pipe 75 back to the reservoir 62. This utilizes the complete discharge from both pumps 57 and 60 for lifting the drilling unit and allows relatively rapid movement in this direction.

When the drill unit is to be lowered into contact with the work relatively rapid lowering movement of said drill may be obtained by leaving the valve 73 open and reversing the position of the valve 67 from that shown in Fig. 3 thus connecting pipe 68 with pipe 66, and pipe 70 with exhaust pipe 74. As soon as the drill comes in contact with the work the valve 73 will be closed thus cutting off the free exhaust or outlet of oil from the cylinder 51 and causing all of the exhaust oil to flow through the by-pass formed by pipe 78, valve 83, valve 77 and pipe 80. The valve 77 will always be open except near the end of an excursion of the drill through a piece of metal and the valve 83 will be set before the drilling operation begins, to regulate the flow through the by-pass and to thereby regulate the speed at which the drill will be fed to the work. As the drill is pressed against the work the pressure in the oil pipes which are connected with the discharge ports of the pumps 57 and 60 will be increased, the check valve 65 will be closed, the oil from the low pressure pump 57 which is not picked up by the high pressure pump will by-pass through the valve 84 and return to the reservoir 62 and the high pressure oil from the pump 60 will flow through the pipes 72 and 66, valve 67, and pipe 68 to the upper end of the cylinder 51 thus forcing the piston 50 downwardly and feeding the drill to the work. In this manner the pressure behind the piston 50 may be kept at any predetermined maximum for which the high pressure relief valve 87 is set while work is being done, any excess oil pumped by the high pressure pump 60 will escape past the valve 87 and return to the reservoir 62 and the rate of feed of the drill will be determined by the amount of opening of the valve 83 by which the exhaust of oil from the cylinder 51 is controlled.

The trip member 114 is adjustably connected with the motor housing and may be set to release the valve 77 at any desired point in the downward movement of the drill thus making it possible to slow up the drill feed at any predetermined stage in the drilling operation. This trip member will usually be set to operate the valve 77 just before the point of the drill breaks through the piece of metal which it is drilling, thus saving breaking and chipping of the point of the drill. Without the use of this safety device I find that the cutting edge of a drill will be completely destroyed in boring a very few holes, whereas, when this safety device is used the same drill may be used for boring a very large number of holes without destruction of the cutting edge.

The valve 83 affords a readily adjustable control of the drilling speed and may be suitably adjusted for drilling different materials.

By placing the variable speed power transmission above the motor and driving through the telescopic shafts 23 and 42 I am able to centralize the torque, reduce vibration, reduce over all length and generally produce a more symmetrical and better balanced machine.

The foregoing description and accompanying drawings clearly disclose a preferred embodiment of my invention, but it will be understood that this disclosure is merely illustrative and that such changes in the device may be made as are within the scope and spirit of the following claims.

I claim:

1. In a hydraulically fed drill, a frame, a housing, a drill carried by said housing, means for rotatively driving said drill, a hydraulic cylinder carried by the frame, a double acting piston in said cylinder, a piston rod secured to said piston and carrying said housing, a liquid storage reservoir, pump means having an intake conduit connected with said reservoir, a discharge conduit from said pump means, a four way valve connected with the discharge conduit from said pump means, two conduits connecting said four way valve with the respective opposite ends of said hydraulic cylinder, an exhaust conduit connecting said four way valve with said reservoir, a shut off valve in said exhaust conduit, a by-pass conduit around said shut off valve, an automatically operated speed retarding valve in said by-pass conduit, and means carried by said motor and drill housing for operating said speed retarding valve whereby flow of liquid therethrough will be retarded as the drill housing approaches the limit of its movement.

2. In a driven hydraulically fed drill, a frame, a housing, a drill carried by said housing, means for rotatively driving said drill, a hydraulic cylinder secured to the frame, a double acting piston in said cylinder, a piston rod connected with said piston and carrying said housing, a liquid storage reservoir, a low pressure pump, intake means for said low pressure pump connected with said reservoir, a discharge conduit from said low pressure pump, a check valve in said discharge conduit, a high pressure pump having an intake and a discharge conduit connected with the discharge conduit from said low pressure pump on opposite sides of said check valve respectively whereby said check valve is between said low pressure pump and the discharge from said high pressure pump, means for driving said pumps, a four way valve connected with the joint discharge conduit from said two pumps, two conduits connecting said four way valve with the respective opposite ends of said hydraulic cylinder whereby liquid under pressure from said pumps may be selectively admitted to either end of said cylinder and the liquid in one end of said cylinder permitted to exhaust, an exhaust conduit connecting said four way valve with said reservoir, a shut off valve in said exhaust conduit, a by-pass conduit around said shut off valve, an automatic speed retarding valve in said by-pass conduit, and means on the housing for governing the movement of said speed retarding valve whereby the flow of liquid is retarded just prior to the end of the drilling stroke of the drill.

3. The apparatus as claimed in claim 2 in which two pressure operated by-pass valves are connected between the respective low pressure pump and high pressure pump and the reservoir, whereby excess liquid from said pumps will be bypassed to said reservoir.

4. The apparatus as claimed in claim 2 in which a flow regulating valve is provided in the conduits between said four way valve and said automatic speed retarding valve.

5. In a hydraulically fed drill, a frame, a housing, a drill and driving unit carried by said housing, a hydraulic cylinder carried by the frame, a double acting piston in said cylinder, a piston rod secured to said piston and carrying said housing, a liquid storage reservoir, pump means having an intake conduit connected with said reservoir, a discharge conduit from said pump means, pressure resistant bypass means connecting said discharge conduit from said pump means with said reservoir, a four way valve connected with the discharge conduit from said pump means, two conduits connecting said four way valve with the respective opposite ends of said hydraulic cylinder, an exhaust conduit connecting said four way valve with said reservoir, a flow retarding valve in said exhaust conduit and means connected with said housing and positioned to operate said flow retarding valve near the end of the drilling stroke of said housing.

MARION B. SAWYER.